US012459361B2

(12) United States Patent
Riviere et al.

(10) Patent No.: US 12,459,361 B2
(45) Date of Patent: Nov. 4, 2025

(54) HEAD-UP DISPLAY DEVICE WITH IMPACT PROTECTION

(71) Applicant: STELLANTIS AUTO SAS, Poissy (FR)

(72) Inventors: Claude Riviere, Chevreuse (FR); Jihane Idali, Safi (MA)

(73) Assignee: STELLANTIS AUTO SAS, Poissy (FR)

(*) Notice: Subject to any disclaimer, the term of this patent is extended or adjusted under 35 U.S.C. 154(b) by 144 days.

(21) Appl. No.: 18/565,460

(22) PCT Filed: May 13, 2022

(86) PCT No.: PCT/FR2022/050916
§ 371 (c)(1),
(2) Date: Nov. 29, 2023

(87) PCT Pub. No.: WO2022/269154
PCT Pub. Date: Dec. 29, 2022

(65) Prior Publication Data
US 2024/0286486 A1    Aug. 29, 2024

(30) Foreign Application Priority Data
Jun. 22, 2021  (FR) ...................... 2106617

(51) Int. Cl.
*B60K 35/70* (2024.01)
*B60K 35/22* (2024.01)
(Continued)

(52) U.S. Cl.
CPC .............. *B60K 35/70* (2024.01); *B60K 35/22* (2024.01); *B60K 35/231* (2024.01); *B60K 35/50* (2024.01);
(Continued)

(58) Field of Classification Search
CPC ........................................................ H05K 5/00
See application file for complete search history.

(56) References Cited

U.S. PATENT DOCUMENTS

| 2020/0269694 A1* | 8/2020 | Minei .................... B60K 35/50 |
| 2020/0269927 A1 | 8/2020 | Ishioka et al. |
| 2020/0271926 A1* | 8/2020 | Minei .................... B60K 35/10 |

FOREIGN PATENT DOCUMENTS

| JP | 2010064709 A | 3/2010 |
| JP | 2012035736 A | 2/2012 |

OTHER PUBLICATIONS

International Search Report for PCT/FR2022/050916 mailed Aug. 8, 2022.
Written Opinion for PCT/FR2022/050916 mailed Aug. 8, 2022.

* cited by examiner

*Primary Examiner* — Jerry Wu
(74) *Attorney, Agent, or Firm* — Sandberg Phoenix & von Gontard, P.C.

(57) ABSTRACT

A head-up display device (1), comprising a housing including a front wall (11), a rear wall and two opposing side walls connecting the side edges of the front wall (11) and the rear wall, and a covering wall (15), each of said walls including an upper edge (110, 120, 130, 140),—the covering wall (15) being connected to the upper edges of the front, rear and side walls so as to cover the internal cavity of the housing (10),—wherein said walls each include a lower edge opposite their upper edge, and at least one of the front (11), and/or rear and/or side walls comprise a frangible portion (55) arranged so as to allow the covering wall (15) to be moved closer to one of the lower edges by breaking said frangible portion.

9 Claims, 4 Drawing Sheets

(51) Int. Cl.
  *B60K 35/231*  (2024.01)
  *B60K 35/50*   (2024.01)
  *B60K 35/60*   (2024.01)
  *B60K 37/00*   (2024.01)
  *G02B 27/01*   (2006.01)
(52) U.S. Cl.
  CPC .............. *B60K 35/60* (2024.01); *B60K 37/00* (2013.01); *G02B 27/0149* (2013.01)

[Fig.1]
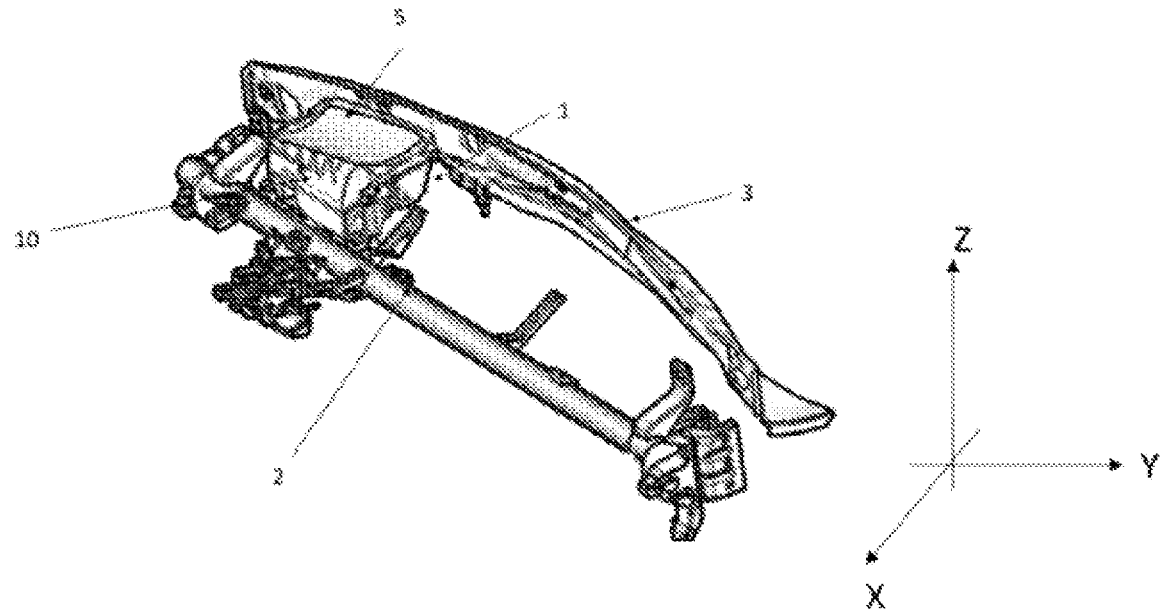
[Fig.2]
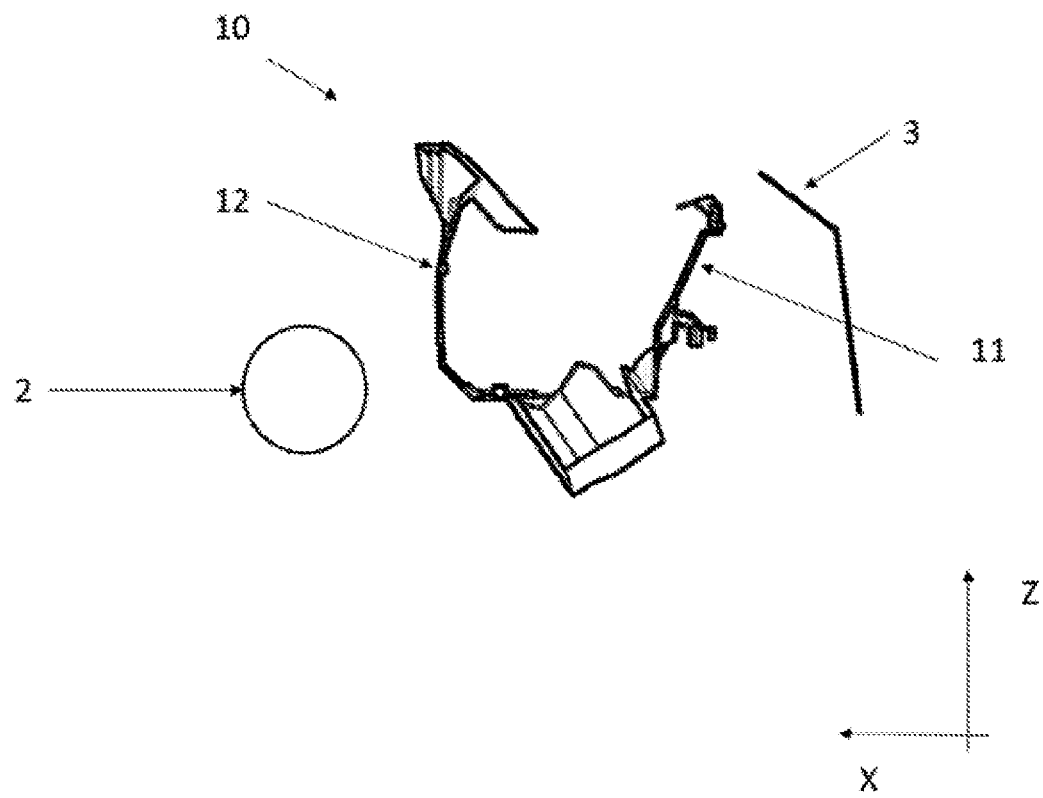

[Fig.3]
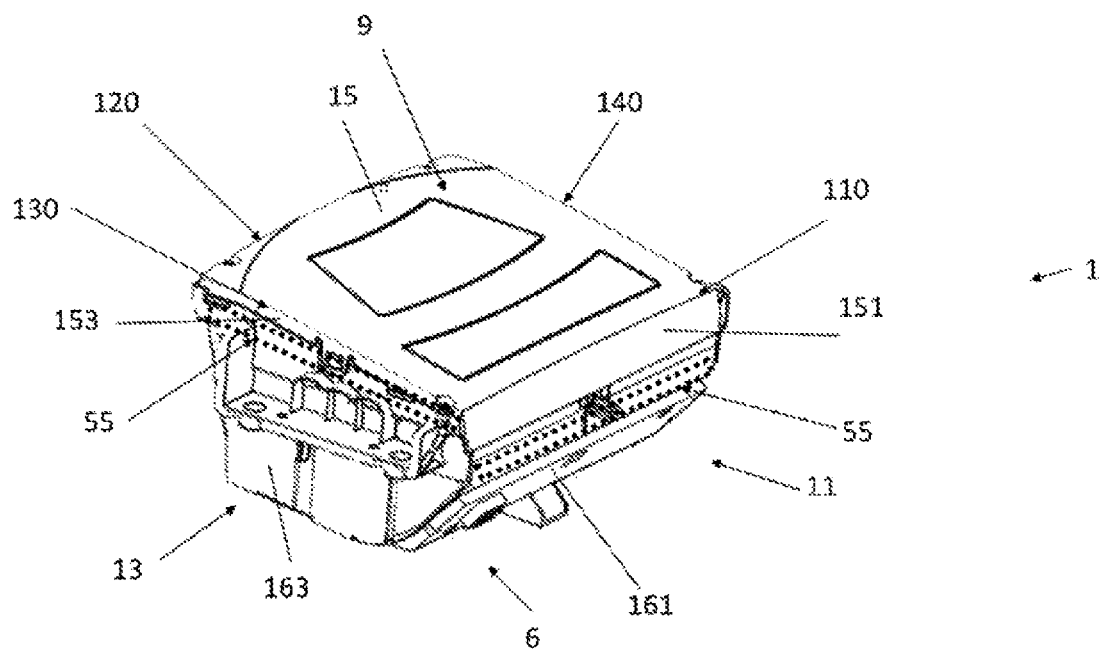
[Fig.4]
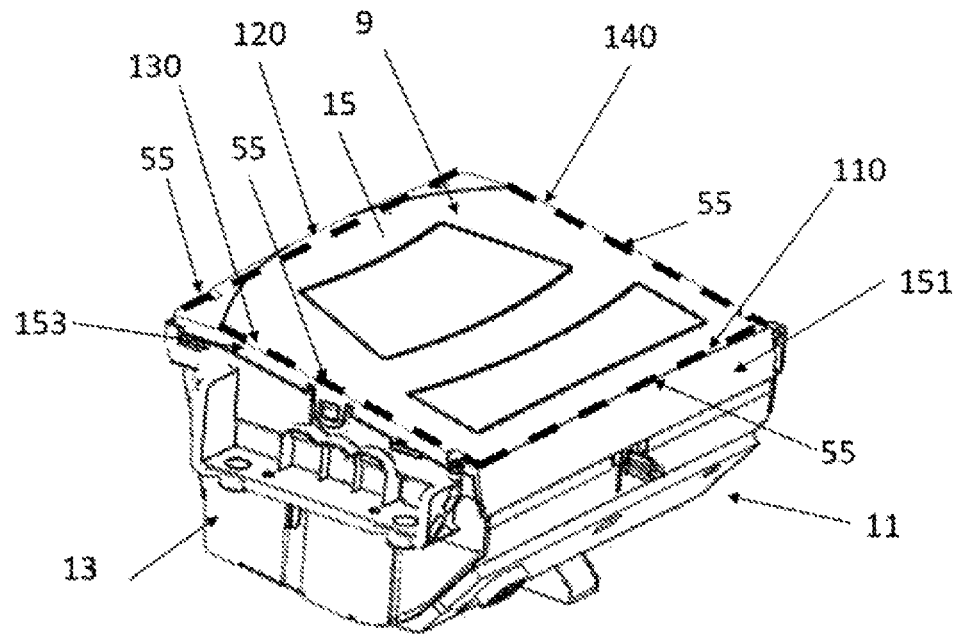

[Fig.5]
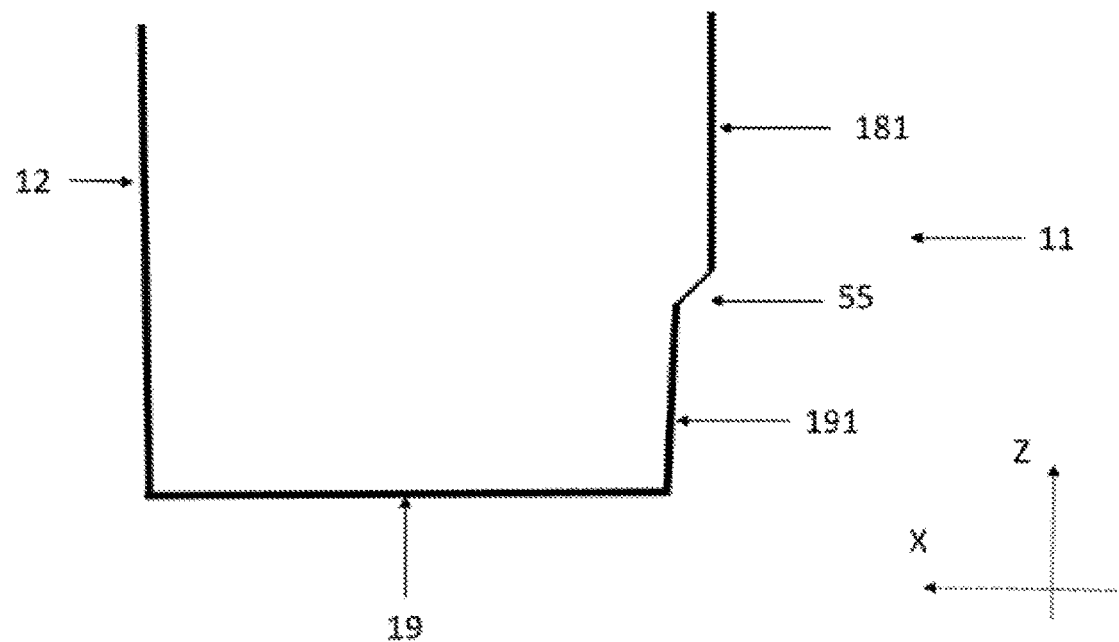
[Fig.6]
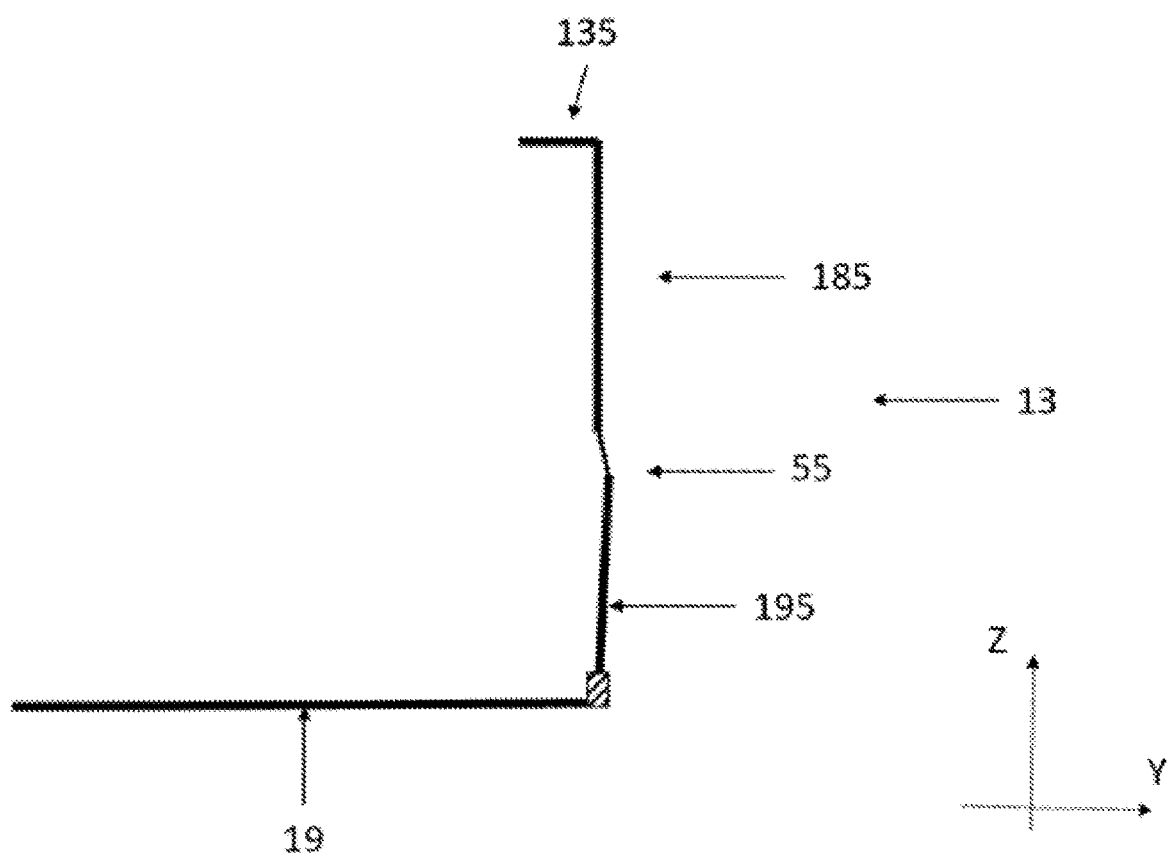

[Fig.7]
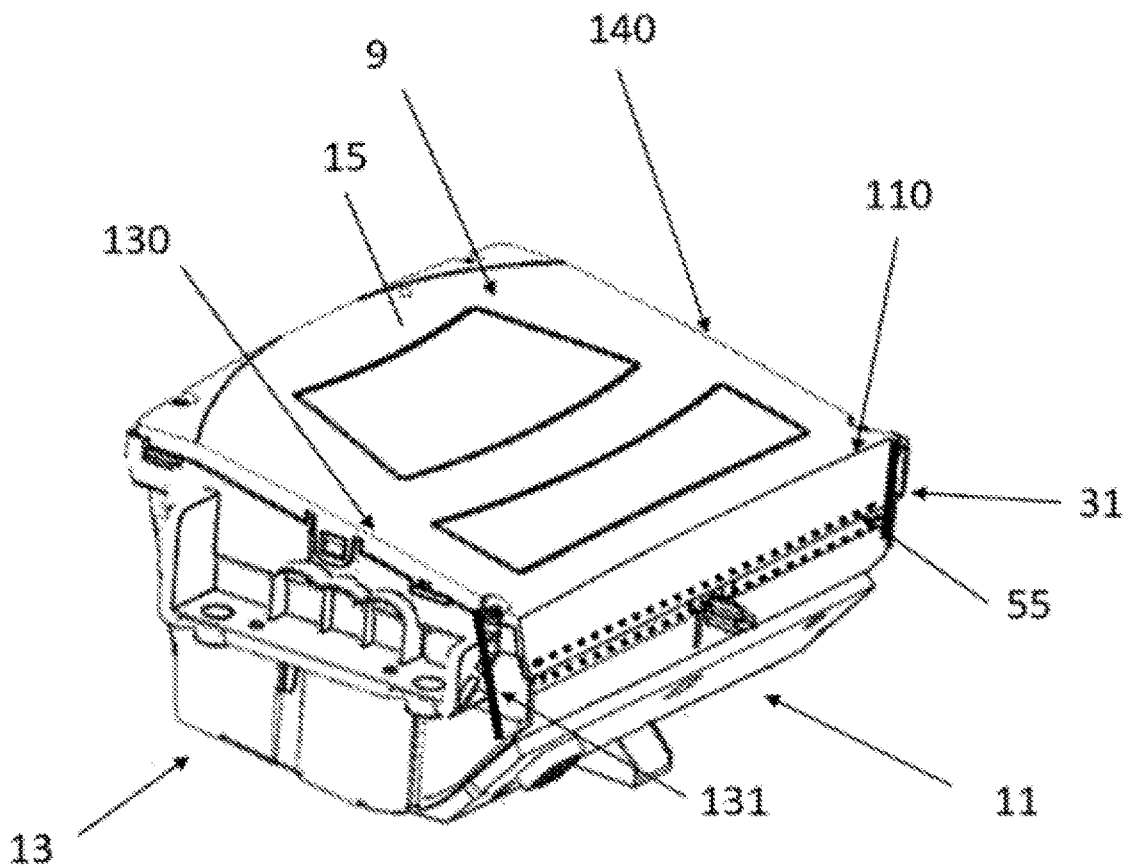
[Fig.8]
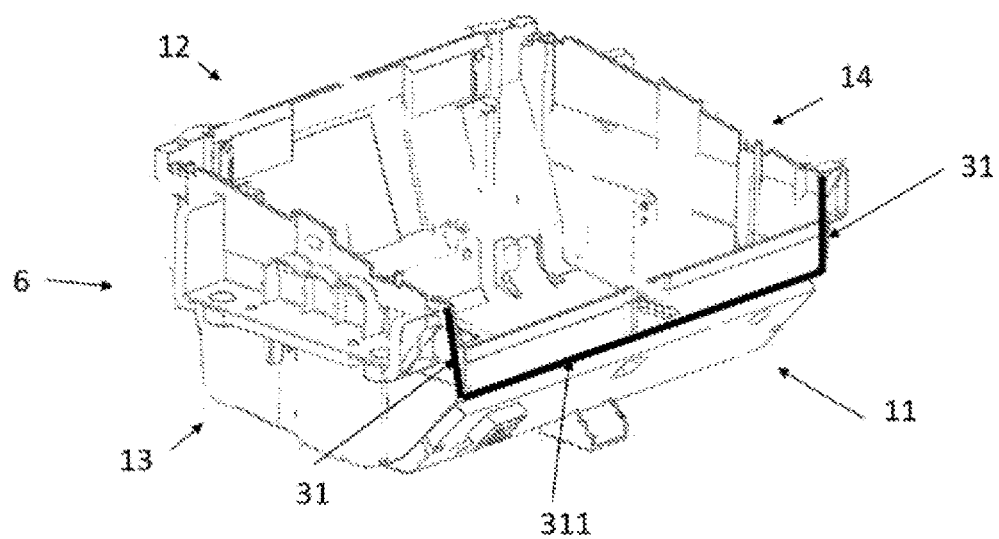

HEAD-UP DISPLAY DEVICE WITH IMPACT PROTECTION

CROSS-REFERENCE TO RELATED APPLICATIONS

This application is the US National Stage under 35 USC § 371 of International Application No. PCT/FR2022/050916, filed May 13, 2022, which claims the priority of the French application 2106617 filed on Jun. 22, 2021, the content (text, drawings and claims) of both said applications being incorporated by reference herein.

BACKGROUND

The devices described herein relate to a head-up device. They mainly relate to the impact behavior of a head-up display device arranged in front of the driver, for better protection of the pedestrian during an impact with the pedestrian's head.

The devices described herein further relate to a vehicle comprising a head-up display device.

To improve driving safety on board a motor vehicle, it is known to provide display devices according to the head-up display principle.

Such a head-up display device makes it possible to project one or more items of information into the driver's field of view.

More particularly, a head-up display device allows the driver to become aware of information useful for navigation without having to lower the gaze toward the dashboard, and therefore without losing sight of the area in front of the motor vehicle.

These devices are generally attached to the dashboard cross-member and close to the front windshield, facing the driver.

Although the current attachment systems ensure the secure attachment of the head-up display device relative to the dashboard cross-member, they prove dangerous in the case of pedestrian impact, in particular during a head impact in an area at the bottom of the windshield.

In the event of an impact of the pedestrian's head in the windshield bottom zone facing the driver, a head-up display device constitutes a stationary element that the pedestrian's head risks impacting following the deformation of the windshield, said device being just behind the windshield and flush with the dashboard skin.

In order for vibrations not to affect the projection of images of the head-up display device, produced either on a strip or on the windshield itself, said head-up display device must be rigidly attached.

In addition, the space available between the bottom zone of the windshield and the dashboard cross-member is increasingly restricted, and the dimensions of the head-up display devices are increasingly large. It is therefore necessary to prevent said device from exerting an excessive force on the head of a pedestrian during a pedestrian head impact in the bottom windshield zone.

US2020269927A describes a vehicle comprising a head-up display device arranged behind the windshield bottom structure and under the windshield bottom. The device comprises an upper part that can deform in the event of a pedestrian impact in order to reduce the forces on the pedestrian. But just this deformation of the upper part is not sufficient to reduce injuries, in particular when the device is close to the windshield or the bottom windshield structure.

The prior art thus does not propose any definition of a head-up display device that sufficiently limits the forces exerted on the head by said head-up display device during a pedestrian head impact in the windshield bottom zone.

SUMMARY

The object is to solve the problems of the prior art. In particular, one of the objectives is to propose a solution that limits the forces exerted on the head by said head-up display device during a pedestrian head impact in the bottom windshield zone. In particular, one of the objectives is proposed for a head-up display device which limits the forces at the head in the event of pedestrian impact.

To this end, the proposed herein is a head-up display device comprising a housing including a front wall, a rear wall facing the front wall, two opposing side walls connecting the side edges of the front wall and the rear wall and a covering wall, said front, rear and side walls defining a cavity internal to the housing and each comprising an upper edge, the covering wall being connected to the upper edges of the front, rear and side walls so as to cover the internal cavity of the housing.

said front, rear and side walls each comprising a lower edge opposite their upper edge, said head-up display device being remarkable in that at least one of the front, and/or rear and/or side walls comprises a frangible portion arranged so as to allow the covering wall to be moved closer to one of the lower edges by breaking said frangible portion under an effort exerted on said covering wall towards one of the lower edges, beyond a given limit.

Thus, the reaction force exerted by the head-up display device is reduced, following the breaking of the frangible portion, in the event of a head impacting the head-up display device.

In one embodiment, the frangible portion is a zone of smaller thickness than the thicknesses or thickness of the rest of the wall comprising said frangible portion.

In one embodiment, the frangible portion is arranged along the upper edge of the front and/or rear and/or side wall.

Thus, a force exerted on the covering wall towards the lower edge of the front, rear, and/or side walls beyond a limit value allows the covering wall to be moved closer to the lower edges of the front, rear, and side walls, that is to say its insertion into the cavity of the housing, and therefore makes it possible to reduce the forces on the head in the event of a pedestrian head impact.

In one embodiment, the frangible portion is arranged between the upper edge and the lower edge of the front and/or rear, and/or side wall, at a distance from the upper edge and the lower edge of said wall or walls, said frangible portion separating said wall(s) into an upper wall part arranged between the frangible portion and the upper edge of said wall or walls, and into a lower wall part arranged between the frangible portion and the lower edge of said wall or walls, the frangible portion connecting the upper part to the lower part.

In one embodiment, the upper part of said wall or walls is separated towards the outside or towards the inside of the cavity of the housing relative to the lower part of said wall so as to be able to slide along one of the faces of the lower part following the breaking of the frangible portion.

Thus advantageously, when a force is applied to the covering wall or to the upper edge of the wall comprising the frangible portion, causing the breaking of the frangible portion, the internal face of the upper wall part slides along the external face of the lower part when the upper wall part is outwardly separated from the lower wall, or the external face of the upper wall part slides over the internal face of the lower wall part when the upper wall part is moved inwardly from the lower wall.

In one embodiment, the housing comprises a bottom wall connected to the lower edges of the front, rear and side walls, and wherein the or each lower part is connected to the bottom wall by the lower edge of its respective wall, and the or each lower part is offset towards the interior of the cavity of the housing relative to the upper part of its respective wall.

Thus advantageously, the front, rear, side walls and the bottom wall of the housing can be made as a single piece by injection of plastic into a mold with simple demolding, the tool not requiring the use of "slider" type moving parts.

The upper part is able to move in the direction of the lower edge of its respective wall outside the exterior face of the lower part or is able to slide along the exterior face of the lower part.

In one embodiment, the front, and/or rear and/or side walls comprise an upper flange extending from their upper edge partially above the cavity of the housing, the or each upper part comprising the upper flange of its respective wall or walls being offset from the lower part of its respective wall towards the inside of the cavity of the housing, the housing further comprising a bottom wall connected to the lower edges of the attached front, rear and side walls.

Thus, the front, rear and side walls can be made in one piece by a molding method without the use of sliders in the manufacturing mold, thus allowing simpler, faster, and less expensive manufacturing.

In one embodiment, the side walls each comprise a breaking line connecting their upper edge along the junction between the side wall and the front wall, or comprise a breaking line extending from the upper edge to a portion of the junction between the side wall and the front wall.

In one embodiment, a breaking line extends from the upper edge of the front wall, along the joining edge between each of the side walls and the front wall, along the upper part of the front wall, the front wall comprising a frangible portion forming a frangible line extending between the breaking lines.

Thus advantageously, in the event of contact on the front part of the housing, at the area of the front wall upper edge, during a pedestrian impact, the upper part of the front wall can break and move toward the lower edges of the housing.

The described devices also relate to a vehicle comprising:
a dashboard cross-member arranged transversely to the vehicle,
a front windshield structure arranged transversely to the vehicle in front of the dashboard cross-member in a vehicle situation,
and a head-up display device, the housing of which is arranged between the front windshield bottom structure and the dashboard cross-member, the front wall of the housing being arranged facing the structure of the windshield bottom, and the rear wall being arranged facing the dashboard cross-member.

Thus, a vehicle with such a head-up display device reduces the forces exerted by the housing on the head of a pedestrian during a pedestrian head impact in the bottom windshield zone.

BRIEF DESCRIPTION OF THE FIGURES

The described devices will be better understood upon reading the following description, given solely as example, and made with reference to the appended drawings, wherein:

FIG. 1 shows a perspective view of the zone of a vehicle located between the dashboard cross-member and the bottom of the windshield, and of the head-up display device arranged between the dashboard cross-member and the windshield bottom structure including the windshield bottom cross-member.

FIG. 2 shows a sectional view along a vertical and longitudinal plane of the head-up display device, and of its housing arranged between the dashboard cross-member and the windshield bottom.

FIG. 3 shows a perspective view from above of the head-up display device.

FIG. 4 shows a perspective view from above of the head-up display device in a variant.

FIG. 5 schematically shows a sectional side view of the housing in another variant.

FIG. 6 schematically shows a sectional side view of the housing in another variant.

FIG. 7 shows a perspective view from above of the head-up display device of the head-up display device in another variant.

FIG. 8 shows a view of the housing of the head-up display device wherein the covering wall is not shown.

The drawings are schematic representations to facilitate understanding. The components are not necessarily shown to scale.

DETAILED DESCRIPTION

In the remainder of the description, the term "comprise" is synonymous with "include" and is not limiting in that it allows the presence of other elements. It is understood that the term "comprise" includes the term "consist of". In the various figures, the same references designate identical or similar elements.

The direction X is the longitudinal axis of the vehicle in running order, oriented from the front of the vehicle toward the rear of the vehicle.

The direction Y is the transverse direction of the vehicle in running order.

In this case, the dashboard crossbeam is substantially parallel to the Y-axis.

The direction Z is the vertical of the vehicle oriented upward.

The schematic representations as presented are in a particular case of a head-up display device arranged facing the driver.

It goes without saying that the described devices are not limited to this particular case of a head-up display device but relates to all types of devices and/or housings installed in a vehicle between the bottom structural elements of the windshield and the dashboard cross-member of a vehicle, that these devices or housings are arranged facing the driver or elsewhere transversely to the vehicle.

Hereinafter, the term HUD means Head-Up Display.

FIG. 1 shows a perspective view of the zone of a motor vehicle located between the dashboard cross-member 2 and the windshield bottom structural elements, such as for example a windshield bottom cross-member 3. FIG. 1 shows an HUD device 1 comprising a housing 10 arranged between the dashboard cross-member 2 and the windshield bottom cross-member 3. A dashboard skin covers these elements, with an opening located opposite the HUD device in order to allow image projection. The dashboard skin is not shown in this FIG. 1.

The windshield bottom cross-member 3, also known as a "lower bay cross-member", is called LBC below.

The housing 10 comprises means of attachment to the dashboard cross-member 2, for example by screwing. The housing 10 comprises an attachment to the LBC 3, not visible in FIG. 1. The HUD 1 device as shown in FIG. 1 is installed in the vehicle longitudinally facing the driver, that is, in front of the driver.

The HUD device 1 comprises optical means installed in the housing 10, for example a set of mirrors inside said housing 10 as well as a projection means, so as to project the information on the windshield (not shown).

In other cases, the HUD device 1 comprises a mobile display strip intended to be arranged opposite the driver.

During a head impact in the windshield bottom zone following the deformations or breakage of the windshield, the head impacts the windshield which deforms under the impact, until the skin of the dashboard and the HUD device 1 are impacted.

FIG. 2 schematically shows a cross-section in a vertical longitudinal plane of the housing 10 of an HUD device 1. The optical elements arranged within the housing 10 are not shown in the various figures.

The housing 10 comprises a front wall 11, and a rear wall 12. The front wall 11 is arranged in a vehicle situation opposite the bottom structure of the windshield, that is to say facing the LBC 3. The rear wall 12 opposite the front wall 11 is spaced away from the front wall 11 in an increasing X direction. The wall 12 is arranged in a vehicle situation opposite the dashboard cross-member 2, and/or equipment arranged on the dashboard cross-member.

The HUD device 1 is also attached to the cross-member 2 in order to ensure in particular good resistance to vibrations.

The housing 10 of the HUD 1 device further comprises two opposite side walls 13, 14 respectively connecting each of the side edges of the front wall 11 and the rear wall 12.

Each of the walls 11, 12, 13, 14 comprises an upper edge 110, 120, 130, 140, defining an upper zone of the HUD device 1 through which an image is projected.

As shown in FIG. 3, the housing 10 further comprises a covering wall 15. The front walls 11, rear wall 12, and the two side walls 13, 14 define a cavity internal to the housing 10. The front walls 11, rear walls 12 and the two side walls 13, 14 each comprises an upper edge 110, 120, 130, 140 defining the upper zone intended to allow a projection of an image between said upper edges for viewing purposes. The covering wall 15 is connected to the upper edges of the front, rear and side walls 11, 12, 13, 14, so as to cover the cavity of the housing. The walls 11, 12, 13, 14 each comprise a lower edge opposite their upper edge. At least one of the front wall 10, and/or rear wall 12 and/or side 13, 14 walls comprises a frangible portion 55 so as to allow at least the covering wall 15 to move closer to one of the lower edges by breaking the frangible portion under a force exerted on said covering wall 15 towards one of the lower edges, beyond a given limit.

As shown in FIG. 3, the housing 10 of the HUD device 1 comprises a cover 9. Said cover 9 itself comprises the covering wall 15 arranged above the cavity of the housing 1. The covering wall 15 comprises openings 150 intended for the projection of an image by the projection means of the HUD device.

The housing 10 comprises a chamber 6 above which the cover 9 is arranged.

The chamber 6 comprises front wall 161, side walls 163 and rear wall.

The cover 9 comprises front and side walls 151 and 153, respectively extending the front wall 161 and side walls of the chamber 6.

The front wall 11 of the housing 10 is therefore formed by the front wall 151 of the cover 9 and the front wall 161 of the chamber 6.

Likewise, each side wall 13, 14 of the housing 10 is formed by one of the side walls 163 of the chamber and one of the side walls 153 of the cover 9 in the extension of said side wall 163 of said chamber. The side wall 13 of the housing 10 is therefore formed by the chamber side wall 163 and the covering wall 153 in its extension. The same applies to the side wall 14 of the housing 10 located opposite, not visible in FIG. 3.

The frangible portion 55 is a zone with a smaller thickness than the thickness of the rest of the wall(s) comprising the frangible portion.

In a variant embodiment, the frangible portion 55 is a wall comprising weakening devices such as holes, or grooves.

In a variant, the fusible portion 55 extends along at least one of the upper edges of one of the front and/or rear, and/or side walls 11, 12, 13, 14. For example, as shown in FIG. 4, the fusible portion 20 extends along the upper edges of the front wall 11, side walls 13, 14 and rear wall.

As shown in FIG. 4, the front walls 151 and side walls 153 of the cover 9 are in the extension of the front 161 and side 163 walls of the chamber, and the frangible portion 55 extends at the junction between the covering wall 15 and the front and side walls of the cover 9.

In a variant, the frangible portion 55 is arranged between the upper edge and the lower edge of the front wall 11, and/or rear and/or side wall 11, 12, 13, 14, at a distance from the upper edge and lower edge of said wall or walls 11, 12, 13, 14. Said frangible portion 55 separates said wall(s) into an upper wall part arranged between the frangible portion and the upper edge of said wall or walls, and in a lower wall part arranged between the frangible portion and the lower edge of said wall or walls, the frangible portion connects the upper part to the lower part.

FIG. 5 schematically shows in cross-section the case where the frangible portion 55 is arranged between the upper edge 110 and the lower edge of the front wall 11, the front wall 11 comprising an upper part 181 and a lower part 191 connected to the frangible portion 55.

As shown in FIG. 5, the housing 10 comprises a bottom wall 19 connected to the lower edges of the front, rear and side walls 11, 12, 13, 14, and wherein the or each lower part is connected to the bottom wall 19 by the lower edge of its respective wall, and the or each lower part is offset relative to the upper part of its respective wall towards the interior of the cavity of the housing 10. Thus, for example, as shown in FIG. 5, the lower part 191 of the front wall 11 is connected to the bottom wall 19 of the housing 10, and is offset towards the interior of the cavity of the housing 10 relative to the upper part 181 of said front wall 11.

In a variant, shown in FIG. 6, the side wall 13 comprises a flange 135 at its upper edge, said side wall 13 comprising an upper part 185, and a lower part 195 connected to a frangible portion 55, a bottom wall 19 being attached to the side wall 13, that is to say that the bottom wall 19 is assembled to the front wall 11, side walls 13, 14 and rear wall 12 by assembly and/or attachment means.

In another variant, the side walls 13, 14 each comprise a breaking line 131 connecting their upper edge to the joining edge between the side wall and the front wall, and/or comprise a breaking line 31 extending from the upper edge along a portion of the joining edge between the side wall 13 or 14 and the front wall 11. Said breaking line 31, 131 is provided to break beyond a limiting force exerted on said breaking line, so as to allow at least a part of the covering wall 15 to move closer to one of the lower edges of the housing 10, following the breaking of the frangible portion 55.

FIG. 7 shows, according to this other variant the side wall 13, and the front wall 11, the side wall 13 comprising the breaking line 31 extending from its upper edge 130, toward the joining edge 131 of the side wall 13 with the front wall 11. As shown in FIG. 7, the front wall 11 further comprises a frangible portion 55.

In another variant, the device comprises a breaking line 31 extending from the upper edge of the front wall 11, along the joining edge between each of the side walls 13, 14 and the front wall 11, along the upper part of the front wall 11, and the front wall 11 comprises a frangible portion 55 forming a frangible line 311 extending between the breaking lines 31.

As shown in FIG. 8, the housing 10 is shown without a cover 9. According to this other variant, the front wall 11 comprises, at its junction with the side walls respectively 13 and 14, two breaking lines 31 and a frangible portion 55 extending between said breaking lines 31. As shown in FIG. 8, the frangible portion 55 forms a frangible line 311 connected to the breaking lines 31. More particularly, as shown in FIG. 8, the frangible line 311 is connected to the lower ends of the breaking lines 31. The upper wall of the front wall 11 is thus arranged between the upper edge of the front wall 11 and the frangible line 311.

In other variants, the cover 9 comprises means for attachment to the upper edges of the walls of the chamber, said attachment means being frangible beyond a given value of force exerted on the cover in a direction from one of the upper edges toward one of the lower edges. Thus, the cover comprising side and front walls of the cover, said side and front walls of the cover are arranged internally or externally relative to the cavity of the housing, relative to the walls of the chamber to which they are attached.

In another variant, the upper and lower walls are attached to one another, the frangible portion 55 consisting of a frangible assembly line, the means of attaching the upper and lower walls to one another being frangible beyond a given force value exerted on the upper edge of the flank towards the lower edge of the flank, each upper wall being offset internally or externally relative to the cavity of the housing 10, of their respective lower wall.

The invention claimed is:

1. A head-up display device comprising a housing comprising a front wall, a rear wall facing the front wall, two opposing side walls connecting the side edges of the front wall and the rear wall, and a covering wall, said front, rear and side walls defining a cavity internal to the housing, and each comprising an upper edge, the covering wall being connected to the upper edges of the front, rear and side walls, so as to cover the internal cavity of the housing, said walls each comprise a lower edge opposite their corresponding upper edge, characterized in that at least one of the front, and/or rear and/or side walls comprises a frangible portion arranged so as to allow the covering wall to be moved closer to one of the lower edges by breaking said frangible portion under an effort exerted on said covering wall towards one of the lower edges, beyond a given limit; and the side walls each comprises a breaking line connecting their upper edge along a junction between the side wall and the front wall, or comprises a breaking line extending across the side wall from their upper edge to a portion of the junction between the side wall and the front wall.

2. The head-up display device according to claim 1, wherein the frangible portion is a zone of smaller thickness than the thickness of the rest of the wall comprising said frangible portion.

3. The head-up display device according to claim 1, wherein the frangible portion is arranged along the upper edge of the front wall, and/or rear wall, and/or side wall.

4. The head-up display device according to claim 1, wherein the frangible portion is arranged between the upper edge and the lower edge of the front wall, and/or rear wall and/or side wall, at a distance from the upper edge and from the lower edge of said wall or walls, said frangible portion separating said wall(s) into an upper wall part arranged between the frangible portion and the upper edge of said wall or walls, and into a lower wall part arranged between the frangible portion and the lower edge of said wall or walls, the frangible portion connecting the upper part to the lower part.

5. The head-up display device according to claim 4, wherein the upper part of said wall(s) is separated towards the outside or towards the inside of the cavity of the housing relative to the lower part of said wall or of said walls so as to be able to slide along one of the faces of the lower part following the breaking of the frangible portion.

6. The head-up display device according to claim 5, wherein the housing comprises a bottom wall connected to the lower edges of the front, rear and side walls, and wherein the or each lower part is connected to the bottom wall by the lower edge of its respective wall, and the or each lower part is offset towards the interior of the cavity of the housing relative to the upper part of its respective wall.

7. The head-up display device according to claim 5, wherein the front, and/or rear and/or side wall comprise an upper flange extending from their respective upper edge partially above the cavity of the housing, the or each upper part comprising the upper flange of its respective wall or wall being offset from the lower part of its respective wall towards the interior of the cavity of the housing, the housing further comprising a bottom wall attached to the lower edges of the front, rear and side walls.

8. The head-up display device according to claim 4, comprising a breaking line extending from the upper edge of the front wall, along the joining edge between each of the side walls and the front wall, along the upper part of the front wall, the front wall comprising a frangible portion forming a frangible line extending between the breaking lines.

9. A vehicle comprising:
a dashboard cross-member arranged transversely to the vehicle,
a windshield bottom structure arranged transversely to the vehicle in front of the dashboard cross-member in a vehicle situation,
and a head-up display device according to claim 1, wherein the housing is arranged between the windshield bottom structure and the dashboard cross-member, the front wall of the housing being arranged facing the windshield bottom structure, and the rear wall being arranged facing the dashboard cross-member.

* * * * *